United States Patent [19]

Lark et al.

[11] 4,343,414
[45] Aug. 10, 1982

[54] SEED PLANTER DRUM DRIVE SYSTEM

[75] Inventors: Wayne W. Lark, Clarendon Hills; Marvin D. Jennings, Naperville, both of Ill.; Marvyn J. Madeksho, Manhattan Beach, Calif.

[73] Assignee: International Harvester Co., Chicago, Ill.

[21] Appl. No.: 187,373

[22] Filed: Sep. 15, 1980

Related U.S. Application Data

[63] Continuation of Ser. No. 932,167, Aug. 9, 1978, abandoned.

[51] Int. Cl.³ .............................................. A01C 7/18
[52] U.S. Cl. ...................................... 221/13; 221/211; 222/63; 222/614; 111/1
[58] Field of Search ................. 222/63, 613, 614, 626, 222/627; 221/9, 13, 211, 185; 111/1; 239/100, 156, 157

[56] References Cited

U.S. PATENT DOCUMENTS

| | | | |
|---|---|---|---|
| 3,398,861 | 8/1968 | Ulrich | 222/626 X |
| 3,511,411 | 5/1970 | Weiss | 222/614 X |
| 3,912,121 | 10/1975 | Steffen | 221/13 |
| 4,085,862 | 4/1978 | Steffen | 221/13 X |
| 4,122,974 | 10/1978 | Harbert et al. | 221/13 |

*Primary Examiner*—Joseph J. Rolla
*Attorney, Agent, or Firm*—F. D. AuBuchon

[57] ABSTRACT

A drive system is provided for driving a rotatable seed drum of a seed planter which includes a fan for supplying air under pressure to the drum. The drum drive system includes an alternator which is mechanically driven, preferably from a drive for the planter fan, and which has output terminals connected to a motor mechanically connected to the seed drum. A ground speed signal generator is mechanically connected to a ground-engaging wheel to develop a signal which has an amplitude proportional to ground speed and which is applied through an adjustable resistance to a field winding of the alternator after passing through a control box. A drum speed signal generator arrangement is provided for developing a drum speed signal having an amplitude inversely proportional to the speed of rotation of the seed drum. This signal is also directed to the control box. Preferably, the signal generators include reluctance generator devices. An adjustable resistor between the control box and the field terminal of the alternator may be utilized to further adjust the control box output.

8 Claims, 2 Drawing Figures

SEED PLANTER DRUM DRIVE SYSTEM

This is a continuation of application of Ser. No. 932,167, filed Aug. 9, 1978, now abandoned.

BACKGROUND OF THE INVENTION

1. Field of the Invention

This invention relates to a seed planter drum drive system and more particularly to a system which can be readily adjusted to obtain a desired seed spacing and which accurately maintains the desired seed spacing. The system is relatively simple and straight-forward in construction and operation and is highly reliable.

2. Description of the Prior Art

Seed planters have heretofore been provided in which seed from a hopper is fed to a revolving seed drum with air under pressure being supplied to the interior of the drum to cause seeds to be picked up in perforated pockets in the periphery of the drum as the drum rotates, the pocketed seeds being released when they reach the top of the drum by seed-release wheels blocking the perforations of the pockets. The seeds then drop into delivery tubes, being propelled therethrough by the pressurized air to be delivered into a furrow opened by a furrow-forming structure. In such arrangements, the drums have been rotated at a speed proportional to the speed of travel of the planter over the ground and the population density of the seeds is fixed in such cases, being changable only by changing the drum. Proposals have been made for controlling the speed of operation of a seed dispenser to change the seed population density but such proposed systems have been relatively complex. For example, the Steffen U.S. Pat. No. 3,912,121 discloses a system in which a DC control motor is connected to a transmission which in turn is connected to a torque amplifier of a hydraulic system controlling the rate at which the seed dispenser is operated, the DC control motor being connected to electronic circuitry.

SUMMARY OF THE INVENTION

This invention was evolved with the general object of overcoming the disadvantages of prior arrangements and of providing a system which is relatively simple in construction and operation and with which the seed population density can be readily adjusted.

A further object of the invention is to provide a drum drive system which is rugged and reliable in operation while being economically manufacturable and readily incorporated in a seed planter.

In one embodiment of a system in accordance with this invention, a DC generator is driven at a generally constant speed, preferably by being mechanically connected to and driven from the fan drive of a seed planter. The generator has output terminals electrically connected to a DC motor which drives a seed drum. The field winding of the generator is electrically connected to a ground speed signal generator mechanically connected to a ground-engaging wheel. With this arrangement, the field excitation of the generator is proportional to ground speed and its output is thereby proportional to ground speed and with the output of the generator being applied to the DC drive motor for the drum, the drum is rotated at a speed proportional to ground speed.

An important feature is in the provision of adjustable resistance means for applying the ground speed signal to the field winding of the generator, adjustment of the resistance means being effective to control the field excitation of the generator and thereby the drive speed of the seed drum and the population density.

Another important feature is in the provision of drum speed signal generator means which develops a signal having an amplitude inversely proportional to the speed of rotation of the seed drum, such signal being applied to the field winding of the DC generator. With this arrangement, an inverse feedback is provided, increasing the accuracy and stability of the control.

In accordance with additional features the ground speed and drum speed signal generator means develop AC signals, preferably including a pair of reluctance generator devices which are relatively inexpensive and which are accurate and reliable. Means are provided for applying DC components of the AC signals through adjustable resistance means to the field winding means. A converter is connected between the reluctance generator device of the drum speed signal generator and the adjustable resistance means.

This invention contemplates other objects, features and advantages which will become more fully apparent from the following detailed description taken in conjunction with the accompanying drawings.

DESCRIPTION OF A PREFERRED EMBODIMENT

Figure 1:
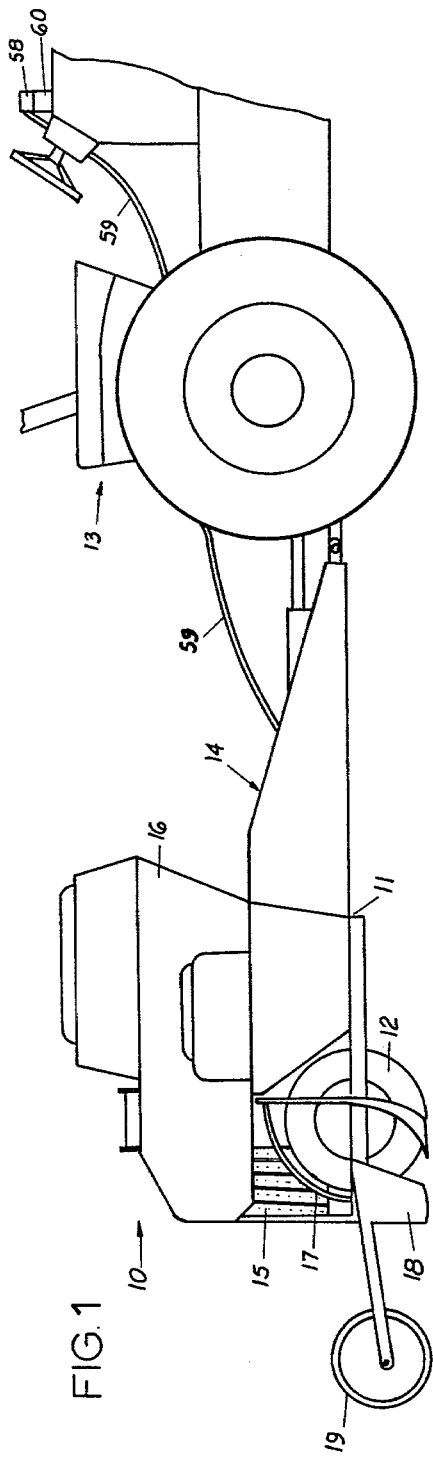
FIG. 1 is a side elevational view of a seed planter incorporating the drum drive system of the invention, the seed planter being shown coupled to a tractor.

Reference numeral 10 generally designates a seed planter with which the drum drive control system of this invention is usable. The illustrated planter 10 has a known type of construction and includes a main frame 11 supported by wheels 12 and arranged to be coupled to a tractor 13 through a tow bar structure 14 which may include a shaft arranged to be coupled to a power take-off shaft of the tractor and arranged to drive a fan of the planter either directly or through a hydraulic pump and motor arrangement, the fan being driven at a generally constant speed. The fan supplies air under pressure into a drum 15 to which seeds are fed from a hopper 16. As the drum 15 turns, seeds are picked up in perforated pockets in the periphery thereof and are held in place therein by air pressure from the fan. When they reach the top of the drum, seed-release wheels block the perforations of the pockets and allow the seeds to drop into one or more delivery tubes 17 through which they are propelled by the pressurized air to drop into a furrow-forming structure 18 and into a furrow formed thereby. A furrow-closing wheel 19 moves over the ground behind each furrow-forming structure.

One delivery tube, one furrow-forming structure and one furrow-closing wheel are provided for each row to be planted and the drum 15 may have one set of perforated pockets for each row to be planted, the sets of pockets being in spaced parallel planes which are transverse to the axis of rotation of the drum. A plurality of pockets in each set are equi-angularly spaced. By way of example, there may be twenty-four pockets in each set with a fifteen degree spacing between adjacent pockets. One drum having four, six or eight sets of pockets may be used for four, six or eight row planters.

For planting a large number of rows, such as twelve or sixteen rows, two drums may be used.

The spacing of the seeds planted in each row is inversely proportional to the number of pockets in each set and the speed of rotation of the drum and is proportional to the linear speed of travel of the planter over the ground. Conversely, the population density of seeds planted is proportional to the number of pockets in each set and the speed of rotation of the drum and is inversely proportional to the linear speed of travel over the ground.

In the drum drive system of this invention, the speed of rotation of the drum is controlled to obtain the desired population density while allowing the speed of travel of the planter to be varied.

Figure 2:
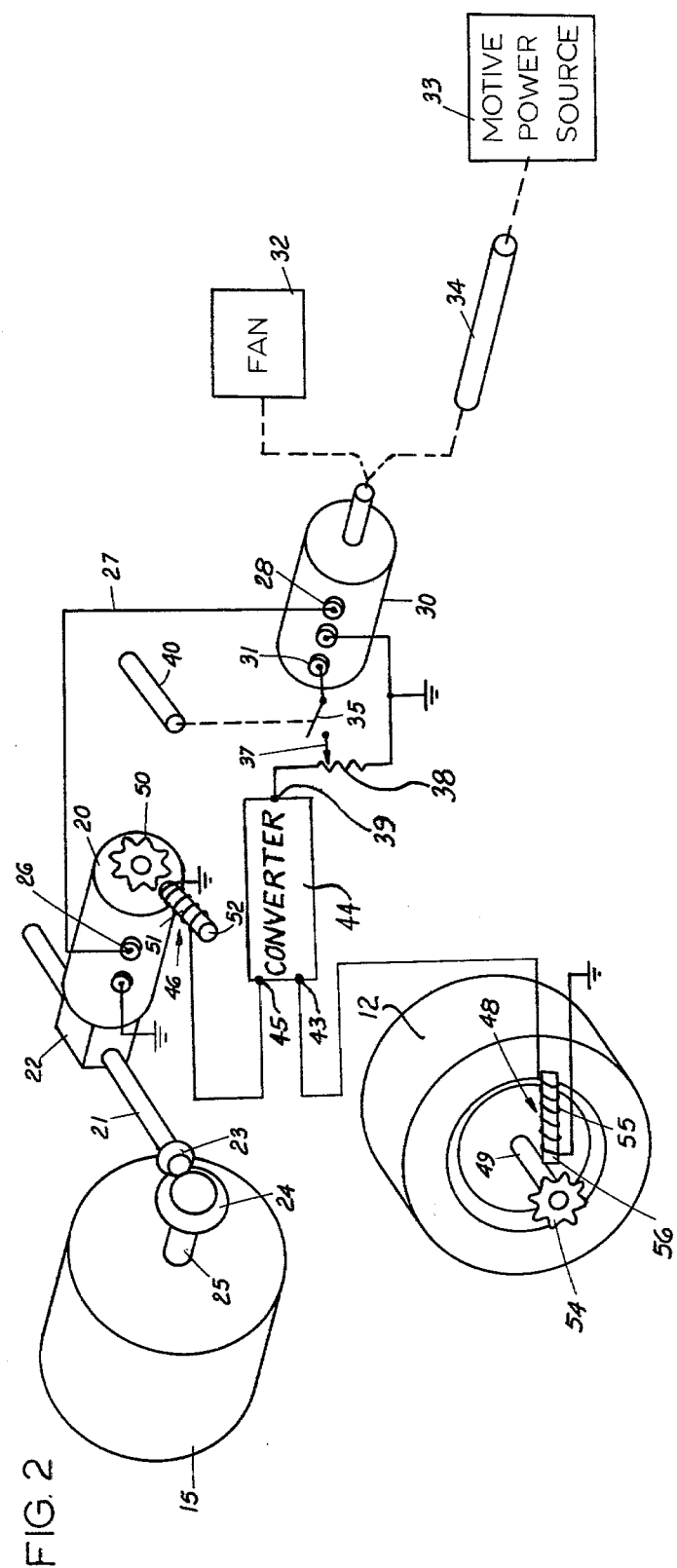
FIG. 2 diagrammatically illustrates a system for driving the drum of the planter shown in FIG. 1.

Referring to FIG. 2, an electric drive motor 20 is provided for driving the drum 15. As diagrammatically shown, motor 20 drives a shaft 21 through a worm gear reduction unit 22 and a bevel gear 23 on one end of the shaft 21 is meshed with a bevel gear 24 on a shaft 25 for the drum 15. In planters having two drums, a bevel gear may be provided on the opposite end of the shaft 21 to mesh with a bevel gear on a shaft for the second drum.

By way of example, motor 20 may be a permanent magnet DC motor operable at a speed of approximately 4000 RPM with a supply voltage of 36 volts, the unit 22 may have a reduction ratio of 40:1 and a further reduction of 2.5:1 may be obtained through the gears 23 and 24 so that the drum may be driven at a speed of from 0 to 40 RPM by controlling the supply voltage to the motor 20.

Motor 20 has one terminal connected to ground and a second terminal 26 connected through a conductor 27 to an output terminal 28 of a generator 30 which has a field winding connected to a terminal 31, opposite terminals of the armature and the field winding being connected together and to ground.

Generator 30 may preferably be an alternator with an associated solid state rectifier operative to develop a voltage of 36 volts when driven at 5000 RPM and with a predetermined rated current applied to the field terminal 31. As diagrammatically illustrated the generator or alternator 30 is driven either from the fan of the planter, indicated by reference numeral 32, or from a motive power source 33 through a shaft 34. Motive power source 33 may be the tractor engine and shaft 34 may be the power take-off of the tractor. Driving of the alternator 30 from the planter fan drive has the advantage that no drive connection to the tractor is required. However, as an alternative, the alternator 30 could be installed on the tractor itself. It is noted that the power requirements for driving the drum are such that the 12 volt supply of the tractor might be overloaded if an attempt were made to use the same for energization of the drum drive motor 20. The use of a motor and an alternator with 36 volt ratings also provides higher efficiency and has other advantages which will be clarified hereinafter.

The field terminal 31 of the alternator 30 is connected through a switch 35 to a movable contact 37 of an adjustable resistance control 38 having a resistance element one end of which is connected to the output terminal 39 of a converter 44. Control 38 may be in the form of a potentiometer as illustrated with an opposite end terminal of the resistance element being grounded, or it may be in the form of a rheostat, with the opposite end terminal of the resistance element being ungrounded. In either case, an adjustable resistance is provided between the contact 37 and the converter 44.

As diagrammatically illustrated, switch 35 is mechanically coupled to a rock-shaft 40 of the planter to be opened when the rock-shaft 40 is raised as when turning the planter at the end of a row or during transport.

The converter 44 has input terminal 45 connected to an output terminal of a device generally 46 which operates to develop an output signal proportional to the speed of rotation of the drum drive motor 20. The converter 44 is also connected at input terminal 43 to an output terminal of a device generally 48 which is operative to develop an output signal proportional to the speed of rotation of a shaft 49 of a ground speed sensing wheel which may be one of the support wheels 12 of the planter. The devices generally 46 and 48 are preferably reluctance devices. As diagrammatically illustrated, the device 46 includes a toothed wheel 50 on the shaft of the motor 20 and a sensing coil 51 on a permanent magnet core 52 in proximity to the toothed wheel 50. As the wheel 50 rotates, the reluctance of the magnetic flux path is varied and an e.m.f. of alternating polarity is developed in the coil 51 which has an amplitude proportional to speed. Similarly, the device 48 comprises a toothed wheel 54 on the shaft 49 and a coil 55 on a core 56.

The converter 44 accomplishes several functions before delivering an output voltage at output terminal 39 for eventual distribution to the field terminal 31 of the alternator 30. The converter 44 will process the signal from input terminal 45 such that it is inverted and consequently inversely proportional to the amplitude of the output signal from the device 46 and also inversely proportional to the speed of rotation of the drum 15. The input from terminal 43 and device 48 is summed with the inverted input from terminal 45.

It should be pointed out that the converter 44 is known in the prior art and the functions that it is to perform may be accomplished in a multitude of fashions and by various means well known to persons having skill in the electronic control field.

The converter 44 may also provide voltage and/or power amplification.

In operation, the speed of operation of the motor 20 is proportional to the output voltage of the alternator 30 which is proportional to the field current thereof. The alternator field current may be thought of as the sum of two components, one being proportional to the speed of rotation of the ground speed sensing wheel and the other being inversely proportional to the speed of rotation of the drum drive motor 20. If there is an increase in the ground speed, the field current increases, the output voltage of the alternator 30 increases and the speed of the drum drive motor 20 increases. An increase in the speed of the drum drive motor 20 decreases the alternator field current thereby decreasing the output voltage of the alternator 30 and thereby opposing a change in the speed of the drum drive motor 20. As a result, the ratio between the drum speed and the ground speed is reduced and variations in the drum speed due to variations in the power required to drive the drum are reduced. Thus the speed of rotation of the drum drive motor 20 is more accurately proportional to the speed of rotation of the ground speed sensing wheel. Through the device 46 and the converter 44, an inverse feedback is provided which increases the stability and linearity of the control.

An important feature is that the speed of rotation of the drum may be readily controlled by adjustment of the potentiometer 38. When the resistance between contact 37 and circuit point 39 is decreased, the field current of the alternator 30 is increased, thereby increasing the alternator output voltage and the drive speed of the drum drive motor 20. Conversely, if the resistance between contact 37 and circuit point 39 is increased, the drive speed of the drum drive motor 20 is decreased. Preferably, the control 38 is physically located on the tractor in a unit 58 in front of the operator and connected through a cable 59 to the remaining portions of the circuitry shown which may be located on the planter 10.

Preferably, an electronic monitoring system may be used in conjunction with the drum drive control system of the invention. The electronic monitoring system may include photoelectric sensing means for sensing the feed of seeds to each row, with sensors being connected to a control and indicating unit 60 physically located under the unit 58 on the tractor. The control and indicating unit may, for example, sound an alarm to indicate the interruption of seed flow to a row and also to indicate the row in which the problem occurs. It may also include indicating lights to indicate when the rate of feed of seeds to any row is increased or decreased above or below preset standards. The Fathauer U.S. Pat. No. 3,928,751 issued Dec. 23, 1975 and the Knepler U.S. Pat. No. 3,927,400 issued Dec. 16, 1975 discloses types of monitoring systems which might be used. The operator either from observation or through the use of such electronic monitoring systems may determine the rate of feed of seeds and adjust the contact 37 accordingly.

It will be understood that modifications and varations may be effected without departing from the spirit and scope of the novel concepts of this invention.

What is claimed is:

1. A drum drive system for a seed planter including a main frame structure, a seed drum rotatably journalled on said main frame structure, fan means for supplying air under pressure to said drum, drive means for said fan means, and a wheel journalled on said main frame structure and engaging the ground to be rotated at a rotational speed proportional to the linear speed of travel of the planter over the ground, said drum drive system comprising:
   DC generator means carried on said seed planter having output terminal means and field winding means, drive means for driving said DC generator means, DC motor means electrically connected to said output terminal means of said DC generator means and mechanically connected to said seed drum, ground speed signal generator means mechanically connected to said wheel to develop an electrical ground speed signal having an amplitude proportional to ground speed, converter means having an input electrically connected to said ground speed signal generator means and connection means for applying said output of said converter means to said field winding means of said DC generator means.

2. In a system as defined in claim 1, said drive means for said DC generator means including a connection to said fan drive means.

3. In a system as defined in claim 1, said drive means for said DC generator means including a connection to a tractor power take-off.

4. In a drum drive system as defined in claim 1, said output connection means including adjustable resistance means.

5. In a drum drive system as defined in claim 4, drum speed signal generator means for developing an electrical drum speed signal having an amplitude inversely proportional to the speed of rotation of said seed drum, and means for applying said drum speed signal to said converter means and said field winding means of said DC generator means.

6. In a system as defined in claim 5, said ground speed and drum speed signal generator means being operative to develop AC ground speed and drum speed signals, and means for applying DC components of said AC signals through said adjustable resistance means to said field winding means.

7. In a system as defined in claim 6, said ground speed and drum speed signal generator means comprising a pair of reluctance generator devices.

8. A seed drum drive system comprising:
   a seed planter including a main frame structure, a seed drum rotatably journalled on said main frame structure, fan means for supplying air under pressure to said drum, drive means for said fan means, and a ground engaging wheel journalled on said main frame structure;
   DC generator means mounted on said seed planter, said generator means having output terminal means and field winding means;
   drive means for driving said DC generator means;
   DC motor means electrically connected to said output terminal means of said DC generator means and mechanically connected to said seed drum whereby said DC motor means may drive said seed drum;
   ground speed signal generator means mechanically connected to said ground engaging wheel to develop an electrical ground speed signal proportional to ground speed;
   converter means having an input electrically connected to said ground speed signal generator means said converter means having connections means for applying said output of said converter means to said field winding means of said DC generator means.

* * * * *